United States Patent
Fuoss et al.

(10) Patent No.: US 8,520,827 B1
(45) Date of Patent: *Aug. 27, 2013

(54) METHOD AND APPARATUS FOR CONTROLLING A NETWORK DEVICE

(75) Inventors: Paul Henry Fuoss, Convent Station, NJ (US); Howard Paul Katseff, Marlboro, NJ (US); Bethany Scott Robinson, Lebanon, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1581 days.

This patent is subject to a terminal disclaimer.

(21) Appl. No.: 11/519,100

(22) Filed: Sep. 11, 2006

Related U.S. Application Data (63) Continuation of application No. 11/216,819, filed on Aug. 31, 2005, now Pat. No. 7,120,241, which is a continuation of application No. 09/898,209, filed on Jul. 3, 2001, now Pat. No. 6,970,696.

(51) Int. Cl.
*H04M 3/42* (2006.01)

(52) U.S. Cl.
USPC .................. 379/212.01; 455/417; 455/445

(58) Field of Classification Search
USPC ............. 379/201.01, 211.01–211.02, 212.01; 455/462, 458, 417, 445, 557; 340/995.1; 400/232

See application file for complete search history.

(56) References Cited

U.S. PATENT DOCUMENTS

| 5,372,439 A * | 12/1994 | Poole et al. ................... 400/232 |
| 6,253,088 B1 * | 6/2001 | Wenk et al. ................... 455/462 |
| 6,529,143 B2 * | 3/2003 | Mikkola et al. ............ 340/995.1 |
| 6,745,040 B2 * | 6/2004 | Zimmerman ................. 455/458 |

* cited by examiner

*Primary Examiner* — MD Shafiul Alam Elahee (57) ABSTRACT

A personal communications device may be placed in, or removed from, a docking station. In response, a predetermined command may be selected from a plurality of predetermined commands and transmitted from the docking station to at least one of a plurality of network devices. Each predetermined command may include the address of the network device and may be configured to cause the network device to respond. In this way, a user's communication infrastructure may be reconfigured in a simple and intuitive manner.

17 Claims, 5 Drawing Sheets

FIG. 2

| LOOKUP TABLE | PREDETERMINED IDENTIFIER | PREDETERMINED COMMAND |
|---|---|---|
| ENTRY 1a | DEFAULT INSERTION COMMAND | TransferActiveCall, NetworkAddress1, PhoneNumber1 |
| ENTRY 1b | DEFAULT REMOVAL COMMAND | TransferActiveCall, NetworkAddress1, CellPhoneNumber |
| ENTRY 2 | I1 | TransferActiveCall, NetworkAddress2, PhoneNumber2 |
| ENTRY 3 | I2 | TransferActiveCall, NetworkAddress3, PhoneNumber3 |
| ENTRY 4 | I3 255.255.255.255 | TransferActiveCall, NetworkAddress3, 255.255.255.255 |
| ENTRY N | I4 255.255.255.255 7325551212 | TransferActiveCall, 255.255.255.255 (732) 555-1212 |
| NONE | NONE | TurnOnVoiceMail, 255.255.255.255 7325551212 |

| LOOKUP TABLE | NETWORK ADDRESS | FILTER CONDITION |
|---|---|---|
| ENTRY 1 | NetworkAddress1 | AVAILABLE |
| ENTRY 2 | NetworkAddress2 | ACCEPT |
| ENTRY 3 | NetworkAddress3 | REJECT |

METHOD AND APPARATUS FOR CONTROLLING A NETWORK DEVICE

RELATED APPLICATIONS

This application is a continuation of application Ser. No. 11/216,819, entitled "Method and Apparatus for Controlling a Network Device," filed on Aug. 31, 2005, which issued on Oct. 10, 2006 as U.S. Pat. No. 7,120,241, which is a continuation of application Ser. No. 09/898,209, entitled "Method and Apparatus for Controlling a Network Device," filed Jul. 3, 2001, which issued on Nov. 29, 2005 as U.S. Pat. No. 6,970,696.

FIELD OF THE INVENTION

The present invention relates generally to network devices. More particularly, the present invention relates to a method and apparatus for controlling a network device using a docking station and a personal communications device, such as a cell phone.

BACKGROUND OF THE INVENTION

Communication between electronic devices is becoming ubiquitous as data communication networks expand into the very fabric of our society. Once limited to the laboratory, data communication networks now connect nearly every imaginable electronic device, including large mainframe computers, mini or microcomputers, personal or handheld computers, personal digital assistants, and electrical controllers such as light switches and thermostats. Even devices that use simple microprocessors with small amounts of memory can operate over limited-bandwidth networks. Using a proper interface, many of these electronic devices can connect to larger communications networks over standard phone lines or cable television lines. Wireless networks allow portable electronic devices, such as personal digital assistants, cellular telephones, or interactive pagers, to connect to more traditional, wired networks. Thus, the ease with which an average user manipulates his or her networked, electronic environment bears directly on the frequency of use and ultimate satisfaction derived from advances in technology.

For example, call forwarding has been a common feature of communication networks for a number of years. And yet, calls are frequently not forwarded for a variety of reasons, including user location uncertainty, security concerns, or inconvenient command requirements.

One device known in the prior art is U.S. Pat. No. 5,197,092 to Bamburak. Bamburak discloses a call forwarding notification system using a receiving station (or "holster"), including a standard phone connected to a landline system (i.e., the PSTN), and a personal communicator (i.e., a cellular telephone) connected to a wireless system. When the cell phone is placed in the receiving station, the receiving station's phone number is sent to the wireless network central exchange, using the call forwarding update number so that all future calls to the cell phone are forwarded to the receiving station over the landline system (i.e., the cell phone's call forwarding feature is turned on). Bamburak also discloses that the receiving station's phone number may be sent to the wireless network central exchange via either the landline system or the wireless system. However, the receiving station and cell phone must be able to communicate with one another via a two-way interface. In Bamburak's "best mode", the cell phone's call forwarding update number and system identification (SID) number are stored in the cell phone and communicated to the receiving station, while in Bamburak's "variation", the receiving station's phone number is stored in the receiving station and communicated to the cell phone.

Bamburak's call forwarding notification system, as well as other systems known in the prior art, fails to satisfy the needs of the average user when confronted with task of controlling his networked, electronic environment. For example, Bamburak fails to discuss whether call forwarding is turned off when the cell phone is removed from the receiving station. Bamburak also fails to teach or suggest that other telecommunications features, such as voice messaging, may be automatically controlled or even that other network devices, such as home automation devices or security systems, can be conveniently controlled. Furthermore, Bamburak fails to disclose whether an active phone call can be transferred from the cell phone to the receiving station when the cell phone is placed in the receiving station, nor does he address whether this transfer can be accomplished without an incoming ring signal. And Bamburak discusses call forwarding in the context of a single phone number (i.e., the cell phone) and fails to consider the advantages of conveniently manipulating all of the phone numbers typically associated with an average user (e.g., cell phone, home phone, multiple work phones, etc.).

Thus, there is a need in the art for a simple and intuitive method for notifying all the appropriate network communications devices that a user has arrived at a particular place, and for those devices to automatically reconfigure the user's communication infrastructure in an appropriate way.

SUMMARY OF THE INVENTION

A personal communications device may be placed in, or removed from, a docking station. In response, a predetermined command may be selected from a plurality of predetermined commands and transmitted from the docking station to at least one of a plurality of network devices. Each predetermined command may include the address of the network device and may be configured to cause the network device to respond. In this way, a user's communication infrastructure may be reconfigured in a simple and intuitive manner.

DETAILED DESCRIPTION

Embodiments of the present invention relate to a method and apparatus for controlling a device attached to, or embedded in, a communications network using a docking station and a personal communications device.

Figure 1:
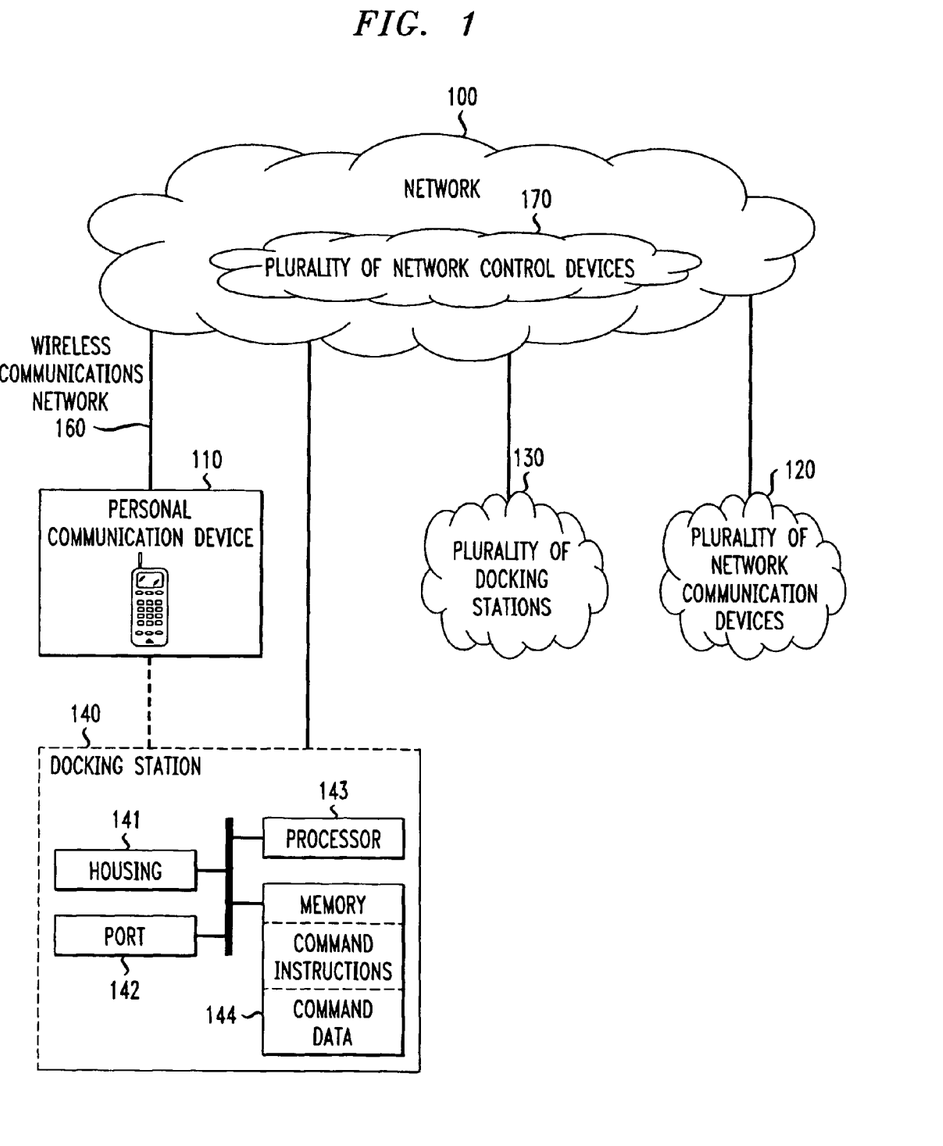
FIG. 1 illustrates elements of a network communications device control system, according to an embodiment of the present invention.

FIG. 1 illustrates a system block diagram of the network communications device control system, according to an embodiment of the present invention.

In an embodiment of the present invention, network 100 may contain a plurality of network control devices 170, and may be connected to a plurality of network terminals, including network communications devices 120 and docking stations 130 (140). Network 100 may also be connected to personal communications device 110 over wireless communications network 160. Network 100 may be, for example, a Local Area Network (LAN), a Wide Area Network (WAN), an Intranet, the Internet, Integrated Services Digital Network (ISDN), Public Switched Telephone Network (PSTN), a combination of networks, etc. Personal communications device 110 may be, for example, a cellular telephone, such as Motorola's StarTAC® ST7860W phone.

The plurality of network control devices 170 may include, for example, network call controllers, such as the Lucent Technologies' 5ESS®-2000 switch, cellular switching systems, Internet Protocol (IP) gateways, switches, or routers, PBX switches, or SS7 network signaling point devices such as SSP (Service Switching Point) switches, STP (Service Transfer Point) switches, mail gateways, computer servers, and SCPs (Service Control Points). The plurality of network communications devices 120 may include answering machines or voice messaging systems, PSTN or ISDN landline telephones, wireless or cellular telephones, IP telephones, home automation devices (e.g., intelligent light switches), or security devices (e.g., burglar alarms).

The plurality of network communications devices 120 may also include, for example, general-purpose notebook or desktop personal computers (PCs), or personal digital assistants (PDAs), such as the 3Com Palm VII. The PDA or PC may also be equipped with the appropriate hardware and software to receive, process, and transmit IP voice data through network 100. Network control devices 170 may be attached to, or embedded in, the network. Docking station 140 may be coupled to the networked device via a communications link, such as RS-232, RS-422, RS-485, Universal Serial Bus (USB), firewire, fiber optic, wireless, infra-red, etc.

In an embodiment of the present invention, docking station 140 includes processor 143, memory 144, port 142 adapted to be coupled to network 100, and housing 141 adapted to be coupled to personal communications device 110. The interface between housing 141 and personal communications device 110 may be provided for direct or indirect communications, which may include any number of physical interfaces, including electrical, electro-magnetic, optical, or infrared. Processor 143 is coupled to memory 144, port 142 and housing 141. Processor 143 may be, for example, a general purpose microprocessor such as the Pentium III microprocessor, manufactured by Intel Corporation, or the PowerPC microprocessor, manufactured by Motorola Corporation. Processor 143 may also be, for example, an Application Specific Integrated Circuit (ASIC), which is designed to embody at least a part of the method in accordance with an embodiment of the present invention in its hardware and firmware. An example of an ASIC is a digital signal processor (DSP). Processor 143 may be, for example, a combination of a general purpose microprocessor and an ASIC.

Memory 144 is any device adapted to store digital information, including Random Access Memory (RAM), Read Only Memory (ROM), a hard disk, flash memory, a compact disk read only memory (ROM), etc., or a combination thereof. At least a part of memory 144 should be writeable as well as readable. Memory 144 stores instructions that are adapted to be executed by processor 143 to perform the method in accordance with an embodiment of the present invention. The term "instructions" includes digital information adapted to be directly or indirectly executed by a processor, including, for example, machine code, source code, encrypted source code or machine code, etc. Memory 143 also stores predetermined command data associated with personal communications device 110.

In an alternative embodiment of the present invention, docking station 140 includes processor 143, memory 144 and housing 141 adapted to be coupled to personal communications device 110. Again, the interface between housing 141 and personal communications device 110 may be provided for direct or indirect communications, which may include any number of physical interfaces, including electrical, electro-magnetic, optical, or infrared. Processor 143 is coupled to memory 144 and housing 141. In this embodiment, docking station 140 is not directly connected to network 100. However, after personal communications device 110 is placed in housing 141, docking station 140 may communicate with network 100 through personal communications device 110, which is connected to network 100 over wireless communications network 160.

The use of multiple docking stations is clearly contemplated by the present invention. For example, a user that desires to have his cellular phone, ISDN work phone, and PSTN home phone all work together may have a docking station for his cellular phone both at work and at home. When the cellular phone is placed in a docking station at work, phone calls to his home or cellular phone may be routed to his work phone. Similarly, when the cellular phone is placed in another docking station at home, phone calls to his cellular phone may be routed to his home phone, while phone calls to his work phone may be routed to either his home phone or, alternatively, to a voice message center or answering machine. And, when the cell phone is out of the docking station, phone calls to his work or home phone may be routed to his cell phone.

Multiple docking stations could also be used to control the response of the communications network to incoming calls. For example, a conference room at work might have a bank of docking stations at the door. Placing a cell phone in the docking station could notify an associated receptionist that the user was in a meeting and transfer all of the user's incoming calls to the receptionist. Similarly, users might have a docking station by their bed or dinner table. Placing the cell phone in that docking station could, for example, send all phone calls to a computer agent allowing only special (e.g., emergency) phone calls to alert on the user's communication infrastructure.

Figure 2:
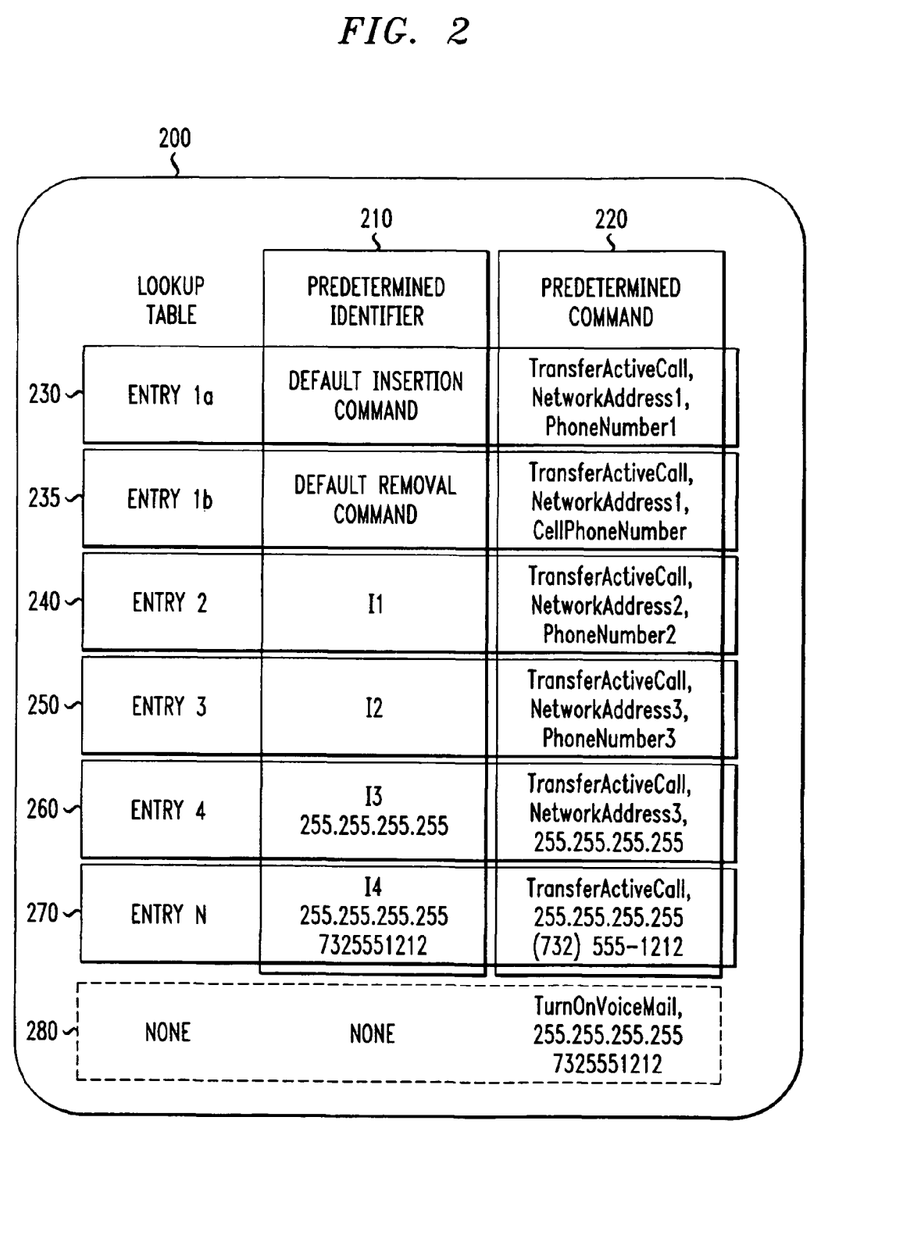
FIG. 2 depicts elements of an identifier lookup table, according to an embodiment of the present invention.

FIG. 2 depicts elements associated with the predetermined command lookup table, according to an embodiment of the present invention.

In one embodiment of the present invention, personal communications device 110 may have an associated predetermined command lookup table 200, which, in general, comprises table Entry 1a 230 to table Entry N 270. Predetermined command lookup table 200 may be stored in memory 144, in a computer coupled to docking station 140, in the personal communications device 110 or in a remote device attached to the network. A table entry within predetermined command lookup table 200 may include, for example, a predetermined identifier 210 and supplemental information such as network addresses (exchanged between the personal communications device 110 and the docking station 140) and an associated predetermined command 220. Entry 1a 230 and Entry 1b 235 may contain default commands that are executed when personal communications device 110 is placed in, or removed from, housing 141, respectively. For example, Entry 1a 230 may contain a predetermined command to transfer an active phone call from personal communications device 110 to "PhoneNumber1" that is sent to a network communications device, such as a network call controller, located at "NetworkAddress 1" whenever the personal communications device 110 is placed in housing 141. Similarly, Entry 1b 235 may contain a predetermined command to transfer an active phone call from "PhoneNumber1" to personal communications device 110 that is sent to a network communications device, such as a network call controller, located at "NetworkAddress1" whenever the personal communications device 110 is removed from housing 141.

In another embodiment, personal communications device 110 and the docking station 140 communicate a predetermined identifier 210 (e.g., "I1") and supplemental information. The predetermined command lookup table 200 is queried to determine the predetermined command 220 associated with predetermined identifier 210. Other predetermined identifier and command pair examples are depicted as well. See, e.g., Entry 2 240, etc.

Single or multiple instantiations of predetermined command lookup table 200 may be stored within memory 144, within a computer coupled to docking station 140, in the personal communications device 110 or in a device attached to the network. Additionally, predetermined command lookup table 200 may be reconfigured.

In another embodiment, a first instantiation of predetermined command lookup table 200, associated with a first personal communications device 110, is stored in memory 144. If a second personal communications device 110 is to be used with docking station 140, then a second instantiation of predetermined command lookup table 200, associated with the second personal communications device 110, may be stored in memory 144. In this embodiment, the second table replaces the first table so that a single predetermined command lookup table 200 is active at any time. Docking station 140 may be configured to support a particular personal communications device 110 by storing an associated predetermined command lookup table 200 in memory 144. Individual predetermined command lookup tables may be stored, for example, within a computer, within at least one of the plurality of communications devices 120, or within at least one of the plurality of docking stations 130.

In yet another embodiment of the present invention, multiple instantiations of predetermined command lookup table 200, each associated with a particular personal communications device 110, may be stored in memory 144, or in a computer coupled to docking station 140. In order to select the appropriate predetermined command lookup table 200, personal docking station 140 first determines which personal communications device 110 has been received by housing 141. This determination may be accomplished when personal communications device 110 is placed in housing 141, for example, through the use of mechanical keys, electrical contacts, or optical connectors or identifiers (e.g., bar code), etc. Alternatively, the determination can be accomplished by receiving an identifying signal or message transmitted from personal communications device 110 to docking station 140. A communications link may thus be established between personal communications device 110 and docking station 140 to identify personal communications device 110. This communications link may include, for example, electrical, optical, wireless, or infra-red technologies, providing for both direct and indirect data transmission mechanisms. Once docking station 140 has identified personal communications device 110, the appropriate predetermined command lookup table 200 can be selected.

Figure 3:
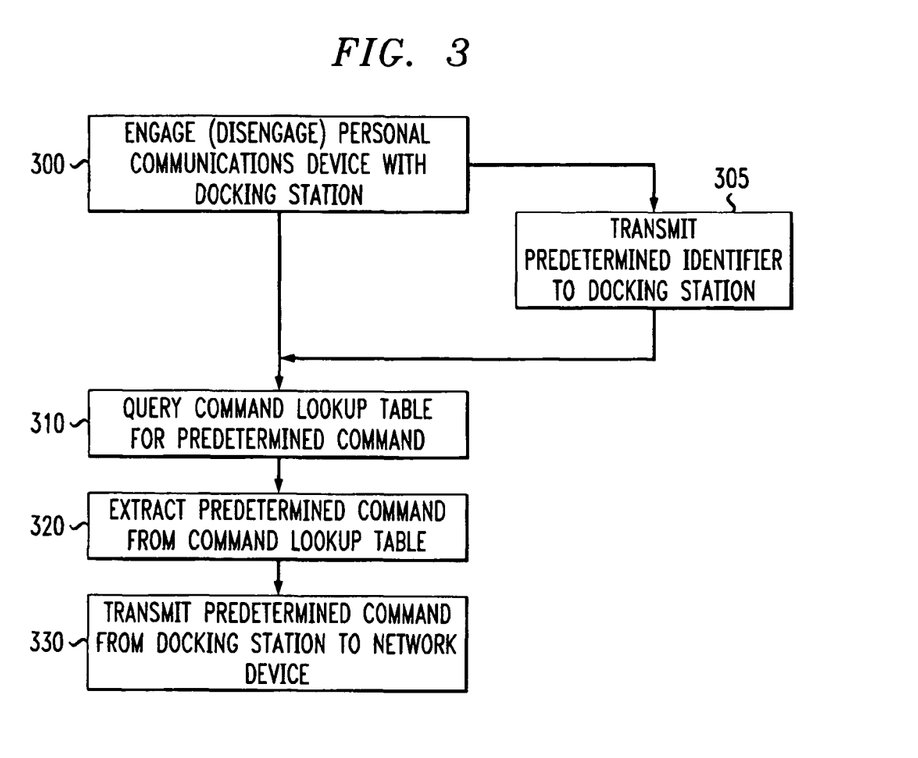
FIG. 3 presents a flowchart illustrating a process for controlling the network communications device, according to an embodiment of the present invention.

FIG. 3 presents a flowchart illustrating a process for controlling the network communications device, according to an embodiment of the present invention.

In step 300, personal communications device 110 may be placed in housing 141. In step 310, docking station 140 detects the engagement of personal communications device 110 in housing 141 and queries predetermined command lookup table 200 for predetermined command 220. In one embodiment, predetermined identifier 210 may not be communicated between personal communications device 110 and docking station 140. In this embodiment, a default command associated with the placement of personal communications device 110 in housing 141 may be identified within predetermined command lookup table 200 (e.g., Entry 1a 230). In response to the query, the first entry (i.e., Entry 1a 230) within predetermined command lookup table 200 may be returned in step 320.

In another embodiment, predetermined identifier 210 may be communicated between personal communications device 110 and docking station 140 in step 305. In this embodiment, predetermined command lookup table 200 is queried and the entry matching predetermined identifier 210 is returned in response to the query. This query may be accomplished, for example, by a keyword search of predetermined command lookup table 200. In this example, predetermined identifier 210 is compared to the corresponding variable within each entry of predetermined command lookup table 200 until a match is determined. In step 320, the matching predetermined command 220 is then returned.

In Step 330, predetermined command 220 may be transmitted from docking station 140 to any one of a number of possible destinations, including, for example, one of the network control devices 170, network communications devices 120, or docking stations 130, which then responds to the command. Of course, if predetermined command 220 is transmitted to one of the network control devices 170, this device may respond by sending a command to one of the network communications devices 120. In one embodiment, docking station 140 is directly connected to network 100 and transmits predetermined command 220 via port 142. In another embodiment, docking station 140 is not directly connected to network 100 and transmits predetermined command 220 via personal communications device 110, which is connected to network 100 via wireless network 160.

Similarly, personal communications device 110 may be removed from housing 141 in step 300. In step 310, docking station 140 detects the disengagement of personal communications device 110 from housing 141 and queries predetermined command lookup table 200 for predetermined command 220. In this embodiment, a default command associated with the removal of personal communications device 110 from housing 141 may be identified within predetermined command lookup table 200 (e.g., Entry 1b 235). In response to the query, the second entry (i.e., Entry 1b 235) within predetermined command lookup table 200 may be returned in step 320.

In step 330, predetermined command 220 may be transmitted from docking station 140, via port 142 or personal communications device 110, to any one of a number of possible destinations, including, for example, one of the network control devices 170, network communications devices 120, or docking stations 130. The destination, which may include at least one of the plurality of network communication devices 120, then responds to the command. Predetermined command 220 may include, for example, a command to a network control device 170 to transfer an active phone call from a network communications device 120 (e.g., PSTN land-line phone) to personal communications device 110, or conversely, from personal communications device 110 to a network communications device 120.

Figure 4:
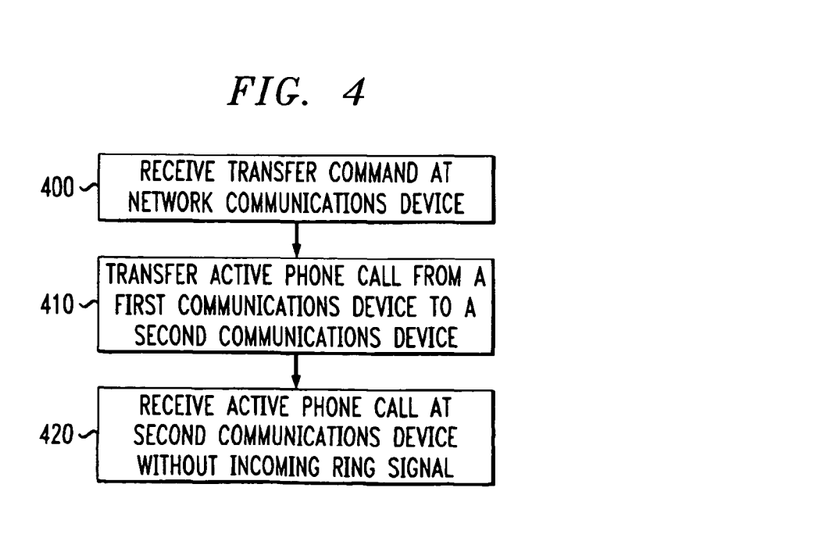
FIG. 4 presents a flowchart illustrating a process for transferring an active phone call, according to an embodiment of the present invention.

FIG. 4 presents a flowchart illustrating a process for transferring an active phone call using a network call controller without an incoming ring signal, according to an embodiment of the present invention. For example, the user could walk into a room while talking on a cellular phone and, by placing the cellular phone into a docking station, transfer the active phone call from the cellular phone to a land-line phone in the room without an incoming ring signal but possibly with an optional confirmation signal. The conversation could then be continued using the land-line phone, i.e., without interruption of the active phone call. Similarly, an active phone call could be transferred from a land-line phone to a cellular phone, without an incoming ring signal, when the cellular phone is removed from the docking station.

In an embodiment, a transfer command is received by at least one of the plurality of network control devices 170 in step 400. The network communications device may be, for example, a network call controller. In another example, the network control device may be an IP gateway, switch or router. At step 410, the active phone call is transferred from personal communications device 110 to an alternative communications device, which may be, for example, one of the plurality of network communications devices 120 coupled to network 100. The active phone call is received by the alternative communications device without an incoming ring signal, at step 420. The transfer command may be sent to the network control device by, for example, docking station 140, personal communications device 110, or the alternative communications device. Of course, the active phone call may be transferred from the alternative communications device to personal communications device 110.

Figure 5:
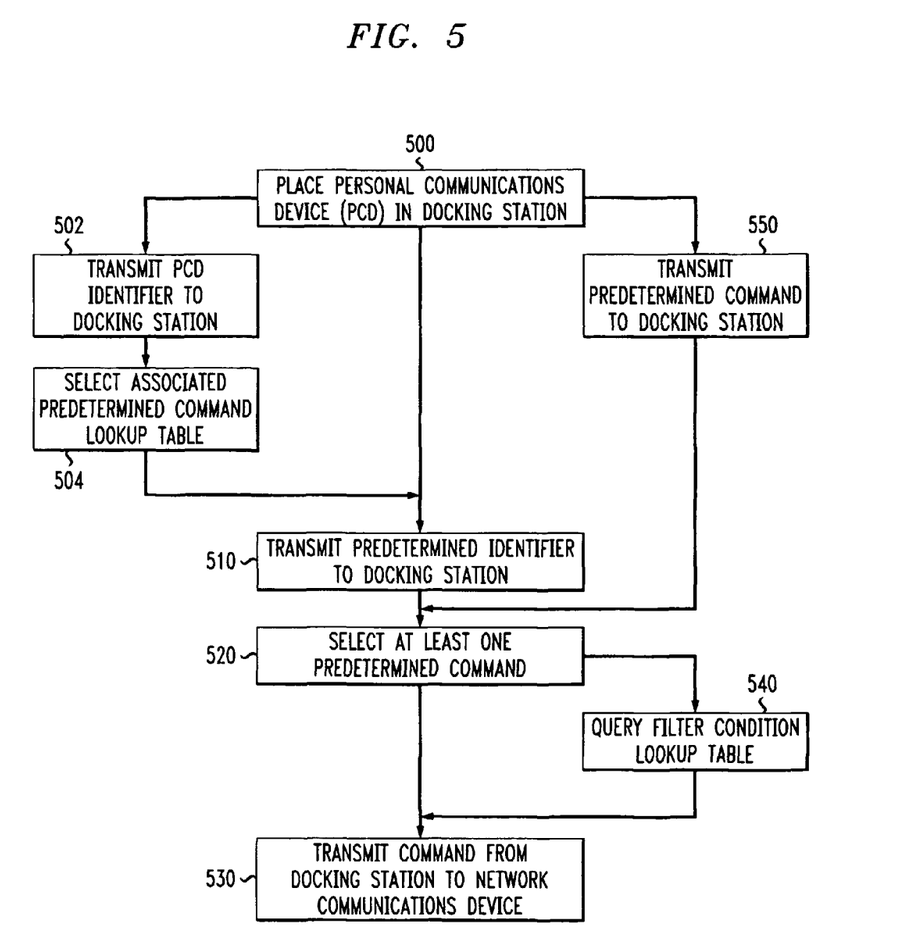
FIG. 5 presents a flowchart illustrating a process for controlling the network communications device, according to an embodiment of the present invention.

FIG. 5 presents a flowchart illustrating a process for controlling the network communications device, according to an embodiment of the present invention.

In an embodiment, personal communications device 110 is placed in housing 141 in step 500, and transmits a predetermined identifier 210 to docking station 140 in step 510. Docking station 140 queries predetermined command lookup table 200 and selects at least one predetermined command 220 that is associated with predetermined identifier 210 in step 520. The command is then transmitted in step 530 to at least one of the plurality of network communications devices 120, which responds in step 540. For example, if personal communications device 110 transmits an "I1" as predetermined identifier 210, docking station 140 would select Entry 2 240 as the matching entry and transmit a "TransferActiveCall" command using "PhoneNumber2" to "NetworkAddress2", which may be the address of a network communications device. In another example, personal communications device 110 may transmit more than one predetermined identifier 210 at any time after placement into housing 141.

In another embodiment, personal communications device 110 is placed in housing 141 in step 500, and transmits a signal or message identifying personal communications device 110 to docking station 140 in step 502. Docking station 140 receives the personal communications device 110 identifier and selects the associated predetermined command lookup table 200 in step 504. Personal communications device 110 then transmits predetermined identifier 210 to docking station 140 in step 510. Docking station 140 queries the associated predetermined command lookup table 200 and selects at least one predetermined command 220 that is associated with predetermined identifier 210 in step 520. The command is then transmitted in step 530 to at least one of the plurality of network communications devices 120, which then responds.

In yet another embodiment, personal communications device 110 is placed in housing 141 in step 500 and transmits predetermined command 280 (FIG. 2) to docking station 140 in step 550. Docking station 140 selects predetermined command 280 in step 520 and transmits predetermined command 280 in step 530 to at least one of the plurality of network communications devices 120, which then responds. In another example, personal communications device 110 may transmit more than one predetermined command 280 at any time after placement into housing 141.

In a further embodiment of the present invention, a computer is coupled to docking station 140, which communicates the placement of personal communications device 110 into housing 141 to the computer in step 500. The docking station 140 may also communicate the personal communications device 110 identifier, predetermined identifier 210, or predetermined command 280 to the computer for processing in accordance with steps 502, 504, 510, or 550. In step 520, the computer selects at least one predetermined command 220 and transmits predetermined command 220 in step 530 to at least one of the plurality of network communications devices 120, which then responds.

In another embodiment, predetermined command 220 may include configuration data to be transmitted to at least one of a plurality of docking stations 130 in step 530. Management of a plurality of docking stations 130 would be beneficial and commensurate with the desire for the user to control his communications infrastructure, for example, if the user has multiple docking stations located at his workplace, in his car, or at his home.

In a further embodiment, predetermined command 220 may enable a local device (e.g. a computer or an otherwise restricted telephone) when the personal communications device 110 is placed in the docking station 140. Or predetermined command 220 may enable a specific software application running on a computer when the personal communications device 110 is placed in the docking station 140. Or predetermined command 220 may enable a remote network device (e.g., a security system, home automation device, etc.) when the personal communications device 110 is placed in or removed from the docking station 140.

Figure 6:
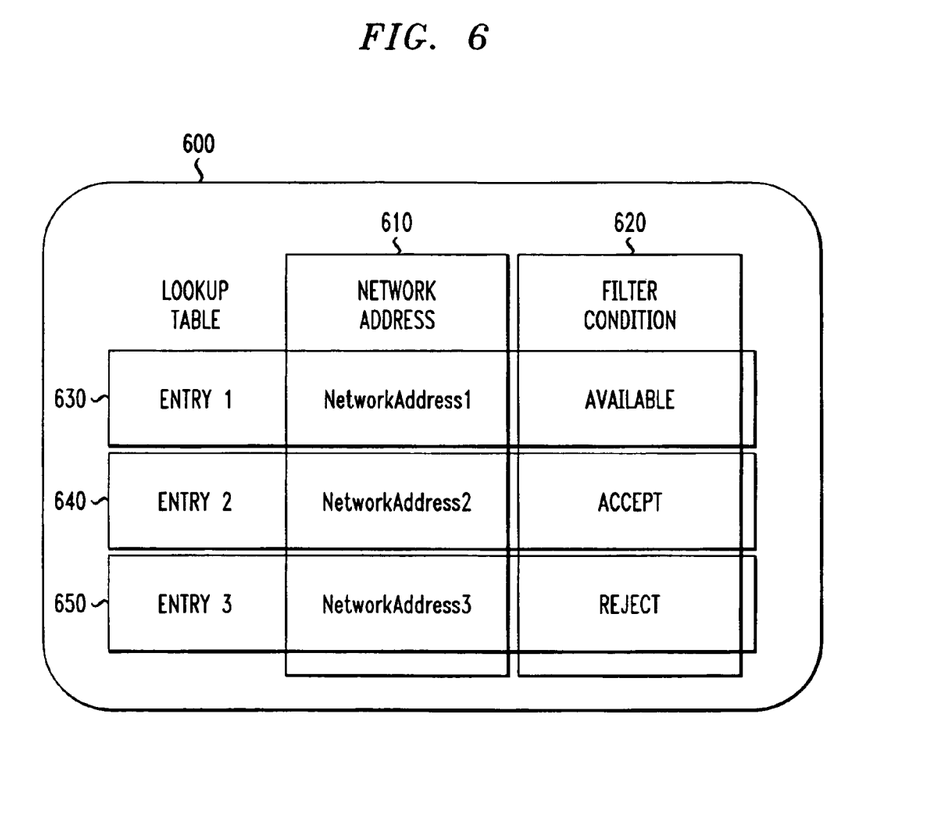
FIG. 6 depicts elements of a filter condition lookup table, according to an embodiment of the present invention.

In another embodiment, each network address within predetermined command lookup table 200 may have an associated filter condition. FIG. 6 depicts elements associated with the filter condition lookup table, according to an embodiment of the present invention.

In this embodiment, docking station 140 transmits predetermined command 220 only if the network device associated with the network address satisfies the filter condition. Filter condition lookup table 600 may have several entries (e.g., Entry 1 630, Entry 2 640, Entry 3 650, etc.) and each entry may have a network address 610 and a filter condition 620. For example, one filter condition may be that predetermined command 220 is only transmitted if the network device associated with the network address is attached to the network. Using a network "ping" command, docking station 140 may verify that the network communications device 120 is attached to the network and capable of receiving commands (e.g., Available). Another condition may be that predetermined command 220 is only transmitted if the network device associated with the network address is willing to accept commands (e.g., Accept). Filter condition lookup table 600 may be queried prior to each transmission to determine whether the command should be transmitted, as in step 540 (FIG. 5). Of course, filter condition lookup table 600 may be reconfigured.

It should, of course, be understood that while the present invention has been described in reference to particular system configurations and processes, other system configurations and processes should be apparent to those of ordinary skill in the alt

What is claimed is:

1. A method for controlling communication to a personal communications device, comprising, at a first network terminal:
   detecting engagement of the personal communications device with the first network terminal; and
   responsive to the engagement:
      retrieving a network address of the personal communications device from the personal communications device,
      based on an identification of the personal communications device, selecting an active predetermined redirect command lookup table associated with the personal communications device, from a plurality of predetermined redirect command lookup tables;
      selecting a first redirect command from the active predetermined redirect command lookup table, the first redirect command being for redirecting communications originally directed to the network address of the personal communication device, to a network address of the first network terminal;
      selecting a second redirect command from the active predetermined redirect command lookup table, the second redirect command being for redirecting communications originally directed to a network address of a second network terminal, to the network address of the first network terminal; and
      transmitting the first and second redirect commands to one or more network controllers for execution.

2. The method of claim 1, further comprising, at a network controller:
   responsive to receiving the redirect commands:
      retrieving a set of filter conditions associated with the first network terminal; and
      redirecting the communications to the first network terminal if the communications satisfy the filter conditions.

3. The method of claim 1, further comprising:
   retrieving the network address of the second network terminal from the predetermined command lookup table associated with the personal communications device.

4. The method of claim 3, wherein retrieving the network address of a second network terminal from the predetermined command lookup table associated with the personal communications device is keyed on a predetermined identifier received from the personal communications device.

5. The method of claim 1, wherein the transmitting further includes:
   transmitting the redirect commands to the personal communications device; and
   transmitting the redirect commands from the personal communications device to the network controller.

6. The method of claim 1, wherein the second network terminal is a land-line phone.

7. The method of claim 1, wherein the second network terminal is a cellular phone.

8. The method of claim 1, wherein the personal communications device is a cellular phone.

9. The method of claim 1, further comprising, at the first network terminal:
   detecting disengagement of the personal communications device with the housing of the first network terminal; and
   responsive to the disengagement:
      transmitting third and fourth redirect commands to the one or more network controllers, the third redirect command being for redirecting communications originally directed to the network address of the first network terminal, to the network address of the personal communications device, the fourth redirect command being for redirecting communications originally directed to a network address of a second network terminal, to the network address of the personal communications device.

10. The method of claim 1, wherein the personal communications device is a PDA.

11. An apparatus for controlling a network device, comprising:
   a first network terminal including:
      a housing adaptively configured to receive a personal communications device;
      a processor; and
      a memory, coupled to the processor, to store instructions that, when executed by the processor, perform operations including detecting engagement of the personal communications device with the housing, and responsive to the engagement, retrieving a network address of the personal communications device from the personal communications device, based on an identification of the personal communications device, selecting an active predetermined redirect command lookup table associated with the personal communications device, from a plurality of predetermined redirect command lookup tables; selecting, by the first network terminal, a first redirect command from the active predetermined redirect command lookup table, the first redirect command being for redirecting communications originally directed to the network address of the personal communication device, to a network address of the first network terminal; selecting, by the first network terminal, a second redirect command from the active predetermined redirect command lookup table, the second redirect command being for redirecting communications originally directed to the network address of a second network terminal, to the network address of the first network terminal; and transmitting the first and second redirect commands to one or more network controllers for execution.

12. The apparatus of claim 11, further comprising a network controller including a processor and a memory, coupled to the processor, to store instructions that, when executed by the processor, perform operations including:
   responsive to receiving the redirect commands:
      retrieving a set of filter conditions associated with the first network terminal; and
      redirecting the communications to the first network terminal if the communications satisfy the filter conditions.

13. The apparatus of claim 11, wherein the predetermined commands in the lookup table are keyed to predetermined identifiers to be received from the personal communications device.

14. A tangible computer-readable medium having stored thereon computer readable instructions for controlling communication to a personal communications device, wherein execution of the computer readable instructions by a processor causes the processor to perform operations comprising:

detecting engagement of the personal communications device with a first network terminal; and responsive to the engagement:

retrieving a network address of the personal communications device from the personal communications device, based on an identification of the personal communications device, selecting an active predetermined redirect command lookup table associated with the personal communications device, from a plurality of predetermined redirect command lookup tables;

selecting, by the first network terminal, a first redirect command from the active predetermined redirect command lookup table, the first redirect command being for redirecting communications originally directed to the network address of the personal communication device, to a network address of the first network terminal;

selecting, by the first network terminal, a second redirect command from the active predetermined redirect command lookup table, the second redirect command being for redirecting communications originally directed to a network address of a second network terminal, to the network address of the first network terminal; and transmitting the first and second redirect commands to one or more network controllers for execution.

15. The tangible computer-readable medium of claim 14, the operations further comprising:

retrieving the network address of the second network terminal from the predetermined command lookup table associated with the personal communications device.

16. The tangible computer-readable medium of claim 15, wherein retrieving the network address of a second network terminal from the predetermined command lookup table associated with the personal communications device is keyed on a predetermined identifier received from the personal communications device.

17. The tangible computer-readable medium of claim 14, the operations further comprising:

detecting disengagement of the personal communications device with the housing of the first network terminal; and responsive to the disengagement:

transmitting third and fourth redirect commands to the one or more network controllers, the third redirect command being for redirecting communications originally directed to the network address of the first network terminal, to the network address of the personal communications device, the fourth redirect command being for redirecting communications originally directed to the network address of a second network terminal, to the network address of the personal communications device.

\* \* \* \* \*